US012508823B2

(12) United States Patent
Castells De Monet et al.

(10) Patent No.: US 12,508,823 B2
(45) Date of Patent: Dec. 30, 2025

(54) THERMAL TREATMENT UNIT WITH SPATIALLY VARYING RADIATION POWER

(71) Applicant: Hewlett-Packard Development Company, L.P., Spring, TX (US)

(72) Inventors: Raimon Castells De Monet, Sant Cugat del Valles (ES); Josep Tarradas i Juan, Sant Cugat del Valles (ES); Eduard Barba Gomez-Alvarez, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 162 days.

(21) Appl. No.: 18/007,190

(22) PCT Filed: Jul. 30, 2020

(86) PCT No.: PCT/US2020/044130

§ 371 (c)(1),
(2) Date: Jan. 27, 2023

(87) PCT Pub. No.: WO2022/025888

PCT Pub. Date: Feb. 3, 2022

(65) Prior Publication Data

US 2023/0234374 A1 Jul. 27, 2023

(51) Int. Cl.
*B41J 11/00* (2006.01)
*B41M 7/00* (2006.01)

(52) U.S. Cl.
CPC ........ *B41J 11/00218* (2021.01); *B41M 7/009* (2013.01)

(58) Field of Classification Search
CPC .... B41J 2/01; B41J 11/0021; B41J 11/00212; B41J 11/00214; B41J 11/00216; B41J 11/00218; B41M 7/0081; B41M 7/009
See application file for complete search history.

(56) References Cited

U.S. PATENT DOCUMENTS

| | | | | |
|---|---|---|---|---|
| 6,152,030 | A | 11/2000 | Fuqua | |
| 7,073,901 | B2 | 7/2006 | Mills et al. | |
| 7,140,711 | B2 | 11/2006 | Nerad et al. | |
| 8,398,229 | B2 | 3/2013 | Vosahlo et al. | |
| 8,820,236 | B2 | 9/2014 | Beier et al. | |
| 8,871,311 | B2 | 10/2014 | Gharbi et al. | |
| 9,649,509 | B2 | 5/2017 | Mazin et al. | |
| 2010/0154244 | A1 * | 6/2010 | Kuta | B41J 11/00214 34/275 |
| 2010/0225720 | A1 | 9/2010 | Ishida | |
| 2012/0293575 | A1 * | 11/2012 | Shimada | B41J 11/00214 347/9 |
| 2013/0076819 | A1 * | 3/2013 | Usuda | B41J 29/38 347/12 |
| 2019/0001706 | A1 | 1/2019 | Heath | |

* cited by examiner

*Primary Examiner* — Leslie J Evanisko
*Assistant Examiner* — Thomas Ray Knief
(74) *Attorney, Agent, or Firm* — Jordan IP Law, LLC

(57) ABSTRACT

A thermal treatment unit for a printer is mountable on a carriage that moves across a printing medium. The thermal treatment unit comprises an emitter element to emit radiation towards the printing medium to thermally treat the printing medium, wherein the thermal treatment unit varies a radiation power output of the emitter element in terms of a spatial position of the carriage along a width direction of the printing medium.

12 Claims, 5 Drawing Sheets

THERMAL TREATMENT UNIT WITH SPATIALLY VARYING RADIATION POWER

BACKGROUND

The disclosure generally relates to printers having a thermal treatment unit that is mountable on a carriage adapted to move across a printing medium.

Printers frequently use electromagnetic radiation, such as infrared light or ultraviolet light, to thermally treat the printing medium, wherein the thermally treating process may comprise the drying, fixing and/or curing of the printing fluid on the printing medium. Many printers of this type have the source of the electromagnetic radiation, such as an LED emitter element, mounted on the printhead carriage that moves to and fro across the printing medium, in a scanning process. The power applied to the LED emitter is usually kept constant across the print zone, but these printers sometimes experience problems with the image quality, durability or color uniformity.

DETAILED DESCRIPTION

In view of the problems described above, it can be considered an objective of the present disclosure to provide improved techniques for radiation treatment of a printing medium that provide a more homogeneous thermal treatment across the width of the printing medium.

This objective is achieved with a thermal treatment unit for a printer according to independent claim 1, and a method for thermal treatment of a printing medium according to independent claim 12. The dependent claims relate to example embodiments.

Figure 1:
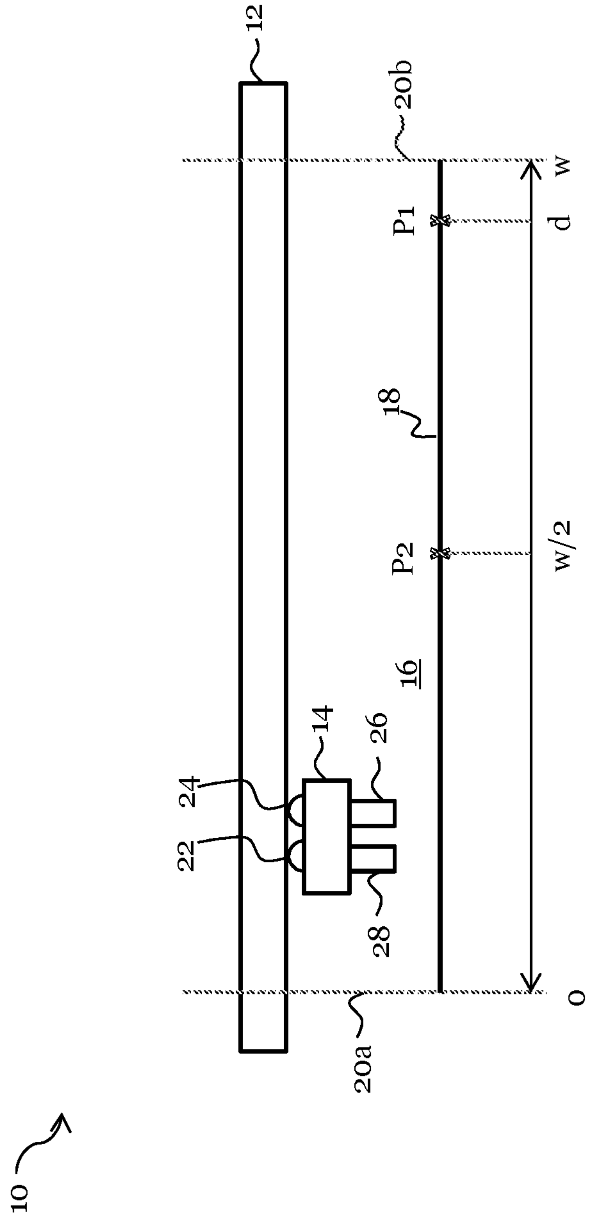
FIG. 1 is a schematic illustration of a printer in which the techniques of the disclosure may be employed, according to an embodiment.

FIG. 1 is a schematic illustration of a printer 10 in which the techniques according to the present disclosure may be employed, according to an embodiment. The printer 10 comprises a frame 12 on which a carriage 14 is mounted to move back and forth across a width w of a printing zone 16. Medium feeding means (not shown) may feed a printing medium 18 through the printing zone 16 in a feeding direction perpendicular to the width direction w. (Subsequently, w may denote both the width direction, and the dimension of the width, for ease of reference.) In FIG. 1, the feeding direction of the printing medium may extend into the drawing pane, or out of the drawing pane. The printing medium 18 may comprise paper or cardboard or plastic or textile material, or any other material suitable to be printed.

The printing zone 16 or printing medium 18, respectively, may extend between a first lateral side portion 20*a* and a second lateral side portion 20*b* opposite to the first lateral side portion 20*a*. The printer 10 may comprise driving means 22 that drive the carriage 14 to scan across the printing zone 16 or printing medium 18, respectively, from the first lateral side portion 20*a* to the second lateral side portion 20*b*, and then backwards to the first lateral side portion 20*a* along the width direction w while the printing medium 18 is advanced in the feeding direction. A sensing element 24 may be provided on the carriage 14 to sense a spatial position of the carriage 14 with respect to the frame 12, and hence with respect to the width direction w of the printing zone 16 and printing medium 18, respectively.

As further shown in FIG. 1, the carriage 14 may comprise a printhead unit 26 and a thermal treatment unit 28. The printhead unit 26 may be adapted to eject a printing fluid, for instance a printing liquid such as ink, towards the printing medium 18 to print on the printing medium 18. The thermal treatment unit 28 may be adapted to emit electromagnetic radiation, such as ultraviolet radiation or infrared radiation, for thermally treating the printing medium 18, comprising thermally treating the printing fluid ejected by the printhead unit 26 onto the printing medium 18.

Thermally treating may comprise heating and/or drying and/or fixing and/or curing and/or sublimating the printing medium 18 or the printing fluid on the printing medium 18, respectively. For instance, drying, in particular radiation drying, may involve a removal of water or other liquids from the printing medium 18. Curing may trigger a photochemical reaction, such as a polymerization of the printing fluid on the printing medium 18. Sublimating the printing fluid may trigger a solid-to-gas transition of a dye component of a printing fluid, such as for marking a substrate, in particular a textile substrate.

The schematic illustration of FIG. 1 shows a carriage 14 with a single printhead unit 26 and a single thermal treatment unit 28. However, this is for illustration only, and in other examples the carriage 14 may comprise a plurality of printhead units 26 and/or a plurality of thermal treatment units 28. Further, FIG. 1 shows the printhead unit 26 and the thermal treatment unit 28 mounted on common carriage 14. Again, the disclosure is not so limited, and in other examples the printhead unit(s) 26 and the thermal treatment unit(s) 28 may be mounted on different carriages that may be independently driven to move across the printing zone 16 or printing medium 18, respectively.

In case the carriage 14 moves across the width w of the printing medium 18 with a constant velocity, each of the positions along the width direction w of the printing medium 18 will experience a first heating phase corresponding to a first pass of the carriage 14 on its way from the first lateral side portion 20*a* to the second lateral side portion 20*b*, followed by a subsequent first cooling phase of dissipative cooling. Then there will be a second heating phase corresponding to a subsequent second pass of the carriage 14 on its way back from the second lateral side portion 20*b* to the first lateral side portion 20*a*, followed by a subsequent second cooling phase of dissipative cooling. However, the details and particulars of these processes may vary depending on the position coordinate $d \in [o, w]$ along the width direction: A position P1 at position d in the vicinity of the second lateral side portion 20*b* that corresponds to the turning point of the carriage 14 will experience the first heating phase and the second heating phase in quick succession, with only a short intermittent first cooling period, whereas the second cooling period is very long. In contrast, a position P2 in the vicinity of the center w/2 of the printing medium 18 will experience a first cooling period and a subsequent second cooling period of substantially equal length.

As a result, in case the thermal treatment unit 28 emits the electromagnetic radiation for thermally treating the printing medium 18 with a constant output power, the energy/heat flow from the thermal treatment unit 28 into the printing medium 18 will differ, depending on the spatial position P1/P2 on the printing medium 18 along the width direction w. The inhomogeneous energy transfer may result in an inhomogeneous image quality, reduced durability or reduced color uniformity.

The techniques according to the present disclosure address these shortcomings with a thermal treatment unit 28 adapted to vary a radiation power output in terms of or in accordance with a spatial position of the carriage along the width direction w of the printing zone 16/printing medium 18. In particular, the thermal treatment unit 28 may be adapted to vary the radiation power output such that each point along the width direction w of the printing zone 16/printing medium 18, including the positions P1 and P2 shown in FIG. 1, receive the same amount of energy transfer, or nearly so.

Figure 2:
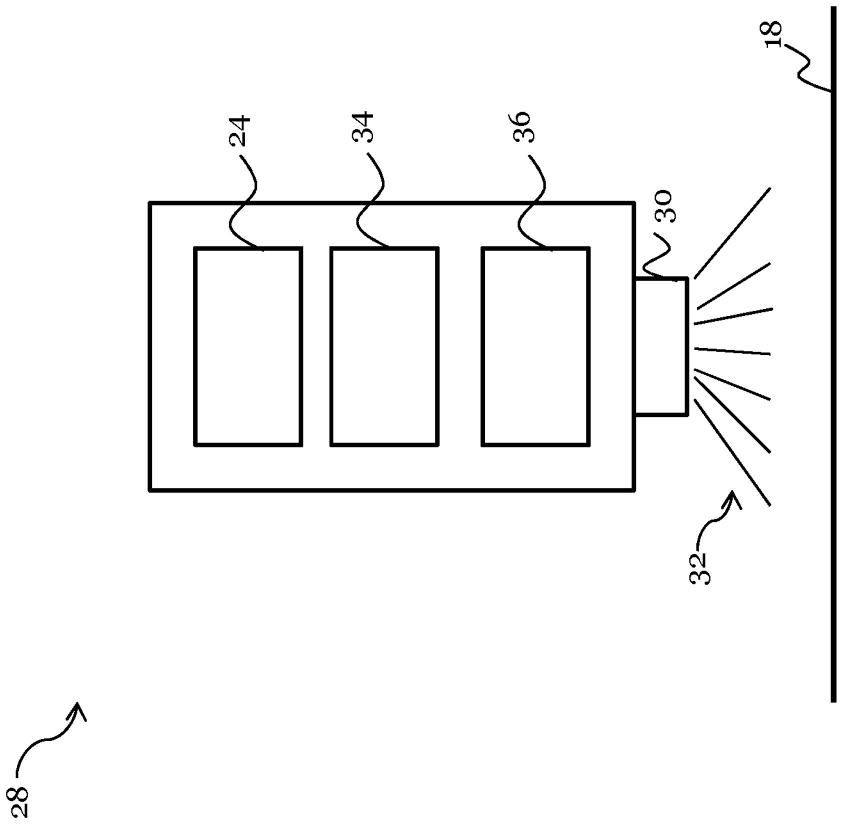
FIG. 2 is a schematic illustration of a thermal treatment unit according to an embodiment.

FIG. 2 is a schematic illustration of a thermal treatment unit 28 according to an embodiment. The thermal treatment unit 28 comprises an emitter element 30 that faces the printing medium 18 and is adapted to emit electromagnetic radiation 32 towards the printing medium 18. For instance, the emitter element 30 may comprise an LED source emitting ultraviolet radiation or infrared radiation.

As further illustrated in FIG. 2, the thermal treatment unit 28 additionally comprises the sensing element 24 adapted to sense a spatial position of the carriage 14 along the width direction w. For instance, the sensing element 24 may be adapted to receive, from the carriage 14, position data pertaining to an encoder position that indicates the position of the carriage 14 with respect to the frame 12.

The thermal treatment unit 28 may further comprise a processing element 34 and a memory element 36. The processing element 34 may comprise a central processing unit (CPU) and random access memory (not shown). The processing element 34 may be adapted to receive, from the sensing element 24, the position data pertaining to the spatial position of the carriage 14 along the width direction w, and may be further adapted to drive the emitter element 30 and to vary a radiation power output (radiation energy per time unit) of the emitter element 30 in accordance with the position data.

The memory element 36 may be adapted to store computer-readable instructions for operating the processing element 34, in particular instructions that allow the processing element 34 to vary a radiation power output of the emitter element 30 in terms of a spatial position of the carriage 14 along the width direction w of the printing medium 18.

In general, an energy flow rate of the energy emitted by the emitter element 30 into the printing medium 18 may be modelled in terms of the heat flow equation, $$\dot{Q} = \frac{\partial Q}{\partial t} = k \cdot a \cdot \frac{\Delta T}{\Delta x} \tag{1}$$

wherein Q denotes the transferred heat/energy, ΔT denotes the temperature difference of the surface of the printing medium 18 with respect to a given reference temperature, Δx denotes the diameter of the printing medium 18, a denotes a size of the surface of the printing medium 18 that is exposed to the electromagnetic radiation 32, and k is a constant that may depend on the physical properties of the printing medium 18, such as the material composition of the printing medium 18, and/or on the physical properties of the printing fluid, such as the material composition of the printing fluid.

Assuming for simplicity that k, a and Δx are all constant across the width of the printing medium 18, Eq. (1) can be simplified to read $$\dot{Q} = \frac{\partial Q}{\partial t} = c \cdot \Delta T \tag{2}$$

for some constant c that absorbs k, a and Δx.

The total energy E transmitted into the printing medium 18 under the influx of the electromagnetic radiation 32 for some time period p is thus:

$$E=\int_{t=0}^{p}\dot{Q}\,dt=c\int_{t=0}^{p}\Delta T\,dt \tag{3}$$

Figure 3:
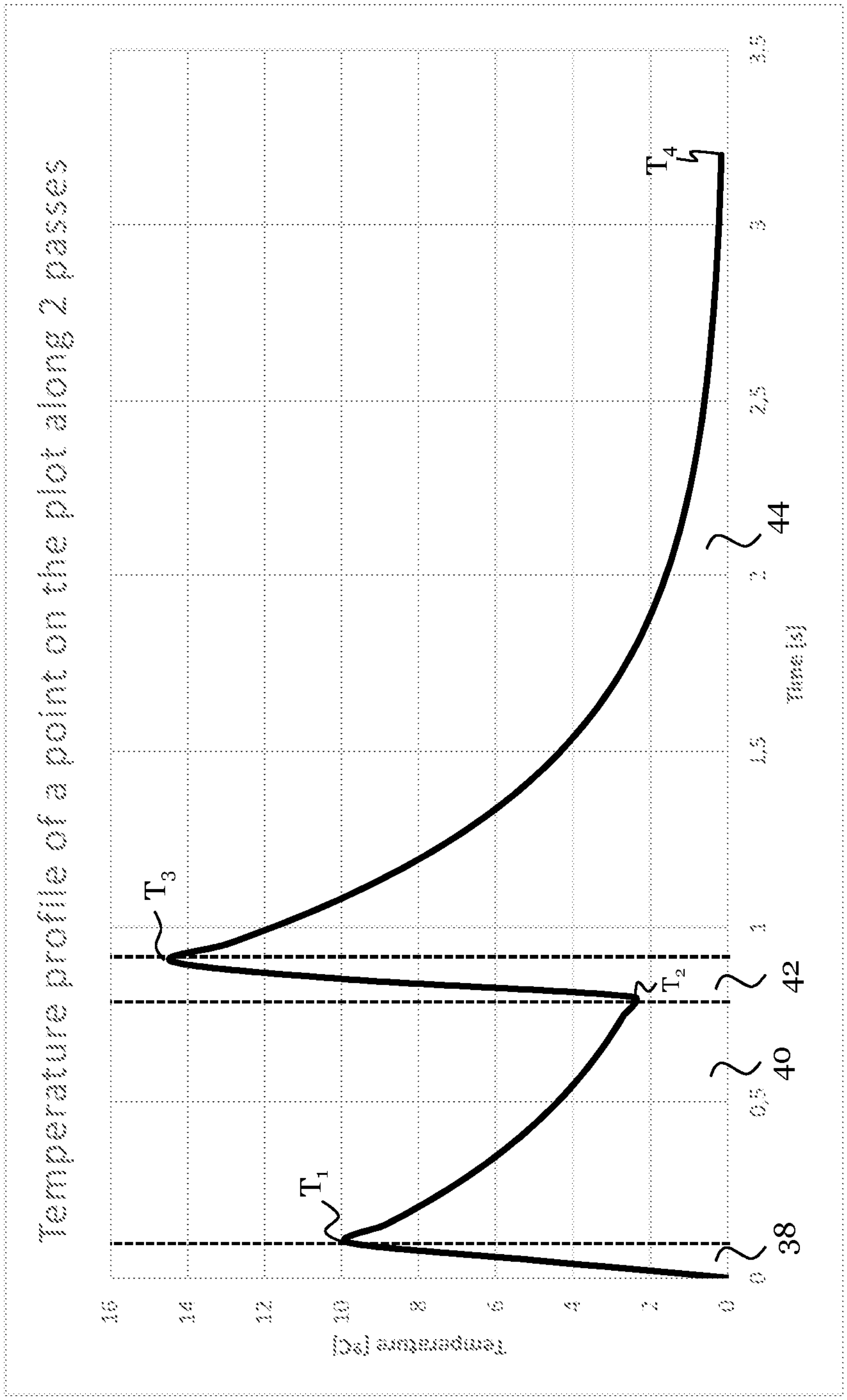
FIG. 3 is a schematic illustration of a temperature profile for a given spatial position along a width direction of a printing medium in a printer according to an embodiment.

FIG. 3 is a schematic illustration of a temperature profile over time for a given position P along the width direction w of the printing medium 18, such as one of the positions P1 and P2 described above with reference to FIG. 1. The particulars of the temperature profile will vary depending on the position P, but the general shape of the temperature profile can be expected to be roughly the same irrespective of the position P, and can be modelled in terms of exponential heating/cooling functions:

$$T_1 = T_{target} + (T_0 - T_{target}) \cdot e^{\frac{-t_{exp}}{\tau_r}} \tag{4}$$

$$T_2 = T_1 \cdot e^{\frac{-2 \cdot A}{\tau_f}} \tag{5}$$

$$T_3 = T_{target} + (T_2 - T_{target}) \cdot e^{\frac{-t_{exp}}{\tau_r}} \tag{6}$$

$$T_4 = T_3 \cdot e^{\frac{-2 \cdot (t_{swath} - (A + t_{exp}))}{\tau_f}} \tag{7}$$

With reference to FIG. 3, Eq. (4) corresponds to the temperature profile in a first heating phase 38, in which the carriage 14 moves from the first lateral side portion 20*a* of the printing medium 18 towards the position P. In Eq. (4), $t_{exp}$ denotes the radiation exposure time of the thermal treatment unit 28, which may in turn depend on the physical properties of the emitter element 30 and the velocity of the carriage 14. The parameter $\tau_r$ is a warm-up time constant that may depend on the physical properties of the printing medium 18, and/or on the physical properties of the printing fluid, such as their respective material compositions. To denotes an initial temperature or reference temperature that can be set to 0 without loss of generality.

The parameter $T_{target}=T_{target}(d)$ is an exponential function target temperature that corresponds to or is proportional to the radiation power output $P_{out}(d)$ of the emitter element 30, and depends on the coordinate d of the position P along the width direction:

$$P_{out}(d)=\lambda \cdot T_{target}(d) \tag{8}$$

for some real constant λ.

After the carriage 14 has passed the position P, the printing medium 18 cools down in a first cooling phase 40 in accordance with Eq. (5) for a time period 2 A, wherein $$A = \frac{w - d}{Cs} \tag{9}$$

and w denotes the width of the printing medium 18, d∈[o, w] denotes the coordinate of the position P along the width direction, and Cs denotes the velocity of the carriage 14 along the width direction. The time period 2 A thus corresponds to the time it takes the carriage 14 to travel from the position P to the lateral side portion 20*b* of the printing medium 18 and back to the position P. The parameter $\tau_f$ is a cool-down time constant that may again depend on the physical properties of the printing medium 18, and/or on the physical properties of the printing fluid, such as their respective material composition.

Once the carriage 14 has returned to the position P, the printing medium 18 will experience a second heating phase 42 that generally corresponds to the first heating phase 38, but starts from a higher base temperature $T_2$ and is governed by Eq. (6), with the same warm-up time constant $\tau_r$.

After the carriage 14 has passed the position P twice and returns to the first lateral side portion 20*a*, the printing medium 18 cools off again in a second cooling phase 44 with the cool-down time constant $\tau_f$, but starting from a higher base temperature $T_3$ in accordance with Eq. (7). In Eq. (7), $$t_{swath} = \frac{w}{Cs} \tag{10}$$

denotes the time period of a carriage swath across the printing medium 18.

The time constants $\tau_r$, $\tau_f$ can be determined experimentally by fitting experimental heating and cooling curves to Eqs. (4) to (7).

Making use of Eq. (3), we may then calculate the amount of energy transferred to the printing medium 18 at the position Pin each of the four subsequent phases 38, 40, 42, 44:

$$E_1 = c\int_0^{t_{exp}}\left(T_{target} + (T_0 - T_{target})\cdot e^{\frac{-t}{\tau_r}}\right)\cdot dt \tag{11}$$

$$E_2 = c\int_{t_{exp}}^{2\cdot A+t_{exp}}\left(T_1\cdot e^{\frac{-(t-t_{exp})}{\tau_f}}\right)\cdot dt \tag{12}$$

$$E_3 = c\int_{2\cdot A+t_{exp}}^{2\cdot(A+t_{exp})}\left(T_{target} + (T_2 - T_{target})\cdot e^{\frac{-(t-2A+t_{exp})}{\tau_r}}\right)\cdot dt \tag{13}$$

$$E_4 = c\int_{2\cdot(A+t_{exp})}^{2\cdot t_{swath}}\left(T_3\cdot e^{\frac{-(t-2\cdot(A+t_{exp}))}{\tau_f}}\right)\cdot dt \tag{14}$$

In FIG. 3, the energy $E_1$ is thus proportional to the area under the temperature profile in the first heating phase 38, whereas the energy $E_2$ is proportional to the area under the temperature profile in the first cooling phase 40, the energy $E_3$ is proportional to the area under the temperature profile in the second heating phase 42, and the energy $E_4$ is proportional to the area under the temperature profile in the second cooling phase 44.

The total energy $E_T$ transmitted to the printing medium 18 at the position P in two subsequent passes of the carriage 14 (from the first lateral side portion 20*a* of the printing medium 18 via the position P to the second lateral side portion 20*b* opposite to the first lateral side portion 20*a*, and back to the first lateral side portion 20*a*) is $$E_T = E_1 + E_2 + E_3 + E_4 \tag{15}$$

In order to obtain a homogeneous heat transfer, the total energy $E_T$ should be constant along the width direction w, irrespective of the position P or position coordinate d, respectively:

$$E_T = E_1 + E_2 + E_3 + E_4 = \text{const.!} \tag{16}$$

Solving Eq. (16) for $T_{target}$(d) and converting into the output power $P_{out}$(d) by means of Eq. (8) yields the desired spatial distribution of the output power of the emitter element 30 in terms of the position coordinate d along the width direction w.

In case the total energy $E_T$ is constant across two subsequent passes across the printing medium 18 (from the first lateral side portion 20*a* of the printing medium 18 to the second lateral side portion 20*b* opposite to the first lateral side portion 20*a*, and back to the first lateral side portion 20*a*), the same will generally be true for subsequent passes across the printing medium 18, and hence Eq. (16) may suffice to ensure a constant total energy $E_T$ during an operation of the printer 10 or thermal treatment unit 28.

Figure 4:
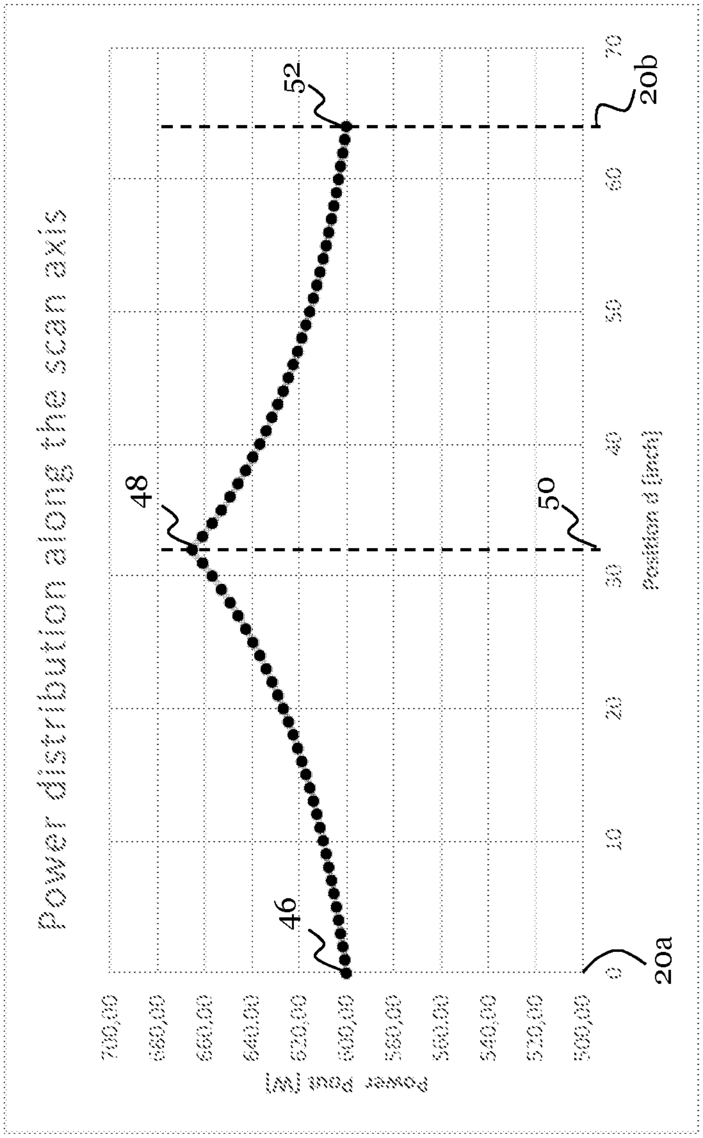
FIG. 4 is a schematic illustration of a spatial radiation power output distribution along a width direction of a printing medium in a printer according to an embodiment.

FIG. 4 shows an example for a corresponding output power distribution of an emitter element 30 in terms of the position coordinate d along the width direction.

As can be taken from FIG. 4, the output power $P_{out}$(d) rises continuously and monotonically from a first power value 46 at d=0 (corresponding to the first lateral side portion 20*a* of the printing medium 18) to a second power value 48 at a center position 50 of the printing medium 18, wherein the second power value 48 is higher than the first power value 46, in particular more than 10% higher than the first power value 46. The output power $P_{out}$(d) then decreases continuously and monotonically from the second power value 48 at the center position 50 towards a third power value 52 at the second lateral side portion 20*b* of the printing medium 18, wherein the third power value 52 is generally identical to the first power value 46. As can be seen from FIG. 4, the output power $P_{out}$(d) is mirror-symmetric with respect to the center position 50. The lower output power values at the lateral side portions 20*a*, 20*b* of the printing medium 18 as compared to the center portion around the center position 5*o* may compensate for the shorter cooling periods towards the lateral side portions 20*a*, 20*b*.

Referring back to FIG. 2, the sensing element 24 may provide to the processing element 34 the current position coordinate d, indicating a spatial position of the carriage 14 along the width direction w of the printing medium 18. Based on the current position coordinate d, the processing element 34 may control an operation of the emitter element 30 in accordance with the output power distribution $P_{out}$(d) as found from solving Eq. (16) and illustrated in FIG. 4, thereby resulting in a more homogeneous heating process across the width of the printing medium 18.

Figure 5:
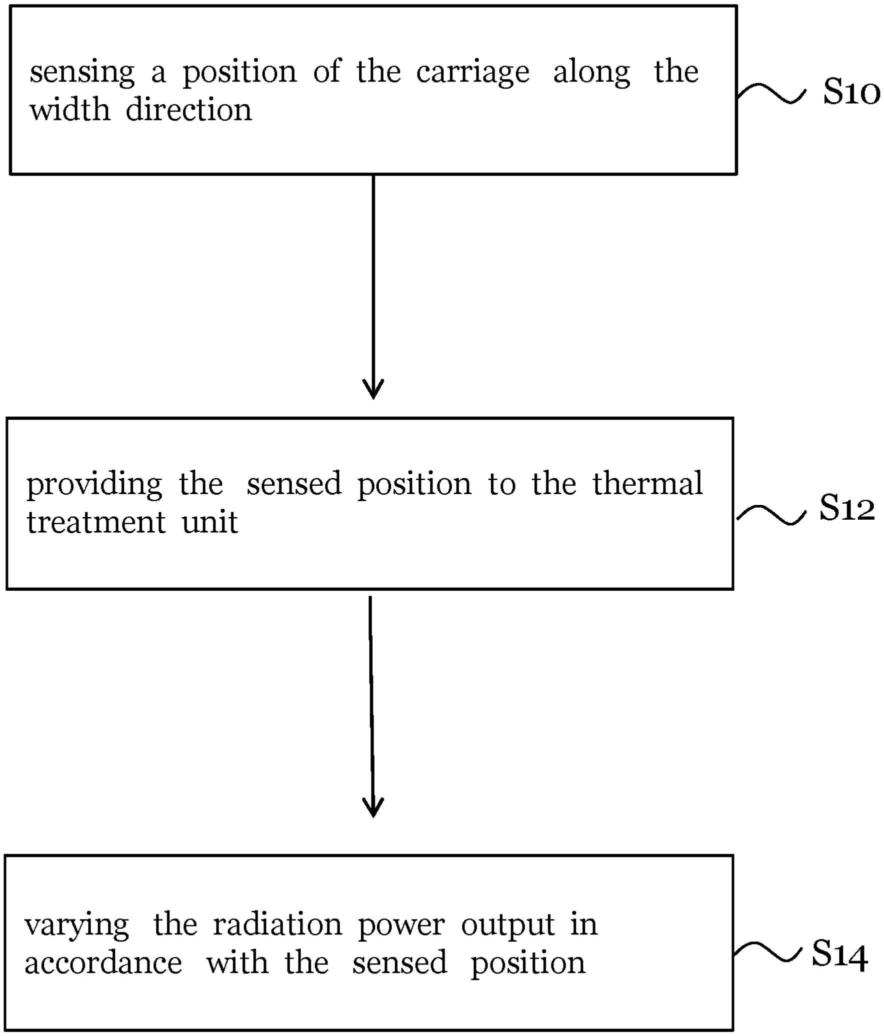
FIG. 5 is a flow diagram illustrating a method for thermal treatment of a printing medium according to an embodiment.

FIG. 5 is a flow diagram illustrating a method for thermal treatment of the printing medium 18 according to an example.

At S10, the position of the carriage along the width direction of the printing medium is sensed. In particular, the carriage may provide respective encoder position data pertaining to its spatial position relative to the printer frame, and hence relative to the printing medium.

At S12, the sensed position is provided to the thermal treatment unit, in particular to the processing element 34.

At S14, the radiation power output of the thermal treatment unit is varied in accordance with the sensed position.

In the example described above with reference to FIGS. 3 and 4, the target functional according to Eq. (16) is a constant total energy $E_T$ across the entire width of the printing medium 18. However, the techniques of the disclosure are not so limited, and one may also solve the system of equations Eq. (4) to (14) for $T_{target}(d)$ and a different target condition, for instance a constant temperature $T_3$ across the entire width of the printing medium 18. As can be taken from Eq. (6) and FIG. 3, the temperature $T_3$ reached at the end of the second heating phase 42 is generally the highest temperature experienced at a given position P, and ensuring that $T_3$ is constant across the entire printing medium 18 may efficiently protect the printing medium 18 against overheating.

Moreover, the techniques of the present disclosure may be employed to accommodate different boundary conditions, such as different cool-down conditions at the lateral side portions 20*a*/20*b* of the printing medium 18, which may be employed to model a discontinuity of the printing medium 18 in that area. The techniques of the disclosure are hence generic and may accommodate a large variety of different system parameters and target functionals.

The techniques of the disclosure may achieve a more homogeneous drying and/or curing that may significantly reduce image quality defects, such as dark zones, bleed, coalescence, or radiation marks. One particular instance are ultraviolet curable printers that oftentimes show a non-uniform glossy finish and/or dark light on banding along the printer width. The techniques according to the present disclosure may mitigate both these defects. Cockle on cellulosic printing mediums like paper may also be reduced.

Moreover, the techniques according to the disclosure may enhance the durability of the plot, while at the same time reducing the average power output of the emitter elements, which may reduce energy waste and increase the lifetime of the emitter elements.

In a first aspect, the disclosure relates to a thermal treatment unit for a printer, wherein the thermal treatment unit is mountable on a carriage that moves across a printing medium. The thermal treatment unit comprises an emitter element to emit radiation towards the printing medium to thermally treat the printing medium, wherein the thermal treatment unit is adapted to vary a radiation power output of the emitter element in terms of a spatial position of the carriage along a width direction of the printing medium.

In the context of the present disclosure, thermally treating the printing medium may denote any process that involves radiation heating of the printing medium and/or a printing fluid on the printing medium.

In particular, thermally treating the printing medium may comprise heating and/or drying and/or fixing and/or curing and/or sublimating the printing medium or a printing fluid on the printing medium, respectively. Heating may comprise radiation heating. Correspondingly, drying may comprise radiation drying.

In particular, the thermal treatment unit may vary the radiation power output along a travel path of the carriage across the printing medium. The travel path may extend between a first lateral side portion of the printing medium and a second lateral side portion of the printing medium that is located opposite to the first lateral side portion. In particular, the travel path may extend along the width direction of the printing medium, which may be perpendicular to a feeding direction of the printing medium.

Varying the radiation power output in accordance with a spatial position of the carriage along the width direction of the printing medium may allow for a heat flow rate from the emitter element to the printing medium to be more homogeneous across the width of the printing medium, when compared with printers in which the radiation power output is constant. This may result in a more homogeneous drying, fixing and/or curing of the printing fluid, and hence in a more homogeneous image quality, improved durability and higher color uniformity across the printing medium.

The thermal treatment unit may vary the radiation power output such that the radiation power output is non-constant along the width direction of the printing medium.

In the context of the disclosure, the radiation power output may be considered non-constant if a value of the radiation power output differs by more than 3% across the width direction, and in particular by more than 5% or by more than 10%.

According to an example, the thermal treatment unit may vary the radiation power output such that the radiation power output is non-constant for a fraction of at least one third of the width of the printing medium, in particular at least one half of the width of the printing medium or two thirds of the width of the printing medium.

In an example, the radiation power output at a lateral side portion of the printing medium is lower than the radiation power output at a center portion of the printing medium.

The carriage may typically pass back and forth in quick succession over a position on the printing medium that is located close to the turning point of the carriage at the lateral side portion of the printing medium, and hence such a position may experience a high heat flow rate into the medium. This may be different for a position at around a center portion of the printing medium, in which there may be a longer delay between two subsequent passes of the carriage that allows the printing medium to cool down substantially between the passes. Lowering the radiation power towards the lateral side portion of the printing medium may compensate for these differences, and hence may lead to a more homogeneous drying.

In particular, the thermal treatment unit may vary the radiation power output to rise from a first power value at a first lateral side portion of the printing medium towards a second power value at a center portion of the printing medium.

The second power value may be higher than the first power value, in particular at least 3% higher or 5% higher or 10% higher than the first power value.

In particular, the radiation power output may rise continuously and/or monotonically from the first power value at the first lateral side portion of the printing medium towards the second power value at the center portion of the printing medium.

Further, the thermal treatment unit may vary the radiation power output to decrease from the second power value at the center portion of the printing medium towards a third power value at a second lateral side portion of the printing medium, the second lateral side portion being opposite the first lateral side portion.

In particular, the radiation power output may decrease continuously and/or monotonically from the second power value at the center portion of the printing medium towards the third power value at the second lateral side portion of the printing medium.

The second power value may be higher than the third power value, in particular at least 3% higher or 5% higher or 10% higher than the third power value.

In an example, the third power value may correspond to the first power value.

In particular, the third power value may differ less than 10% from the first power value, and in particular may differ less than 5% or less than 3% from the first power value.

According to an example, a spatial power distribution of the output power along the width direction may be mirror-symmetric with respect to a center portion of the printing medium.

In the context of the disclosure, a spatial power distribution may be considered mirror-symmetric with respect to a center portion of the printing medium if the respective output power values at spatial positions along the width direction that are mirror-symmetric with respect to the center portion differ by less than 10% for all spatial positions, in particular by less than 5% or less than 3%.

According to an example, the thermal treatment unit varies the radiation power output such that a total heat flow from the emitter element to the printing medium is constant irrespective of a spatial position along the width direction.

In the context of the disclosure, the total heat flow may be considered constant if a value of the heat flow differs by less than 10% across the width direction, and in particular by less than 5% or by less than 3%.

The thermal treatment unit may also vary the radiation power output such that a maximum temperature of the printing medium is constant irrespective of a spatial position along the width direction.

In the context of the disclosure, the maximum temperature may be considered constant if a value of the maximum temperature attained at a spatial position varies by less than 10% across the width direction, and in particular by less than 5% or by less than 3%.

In the context of the present disclosure, any device adapted to thermally treat or heat a printing medium by means of radiation may be considered a thermal treatment unit.

Any medium suitable for printing may be considered a printing medium in the context of the present disclosure. In particular, the printing medium may comprise paper, cardboard, textile and/or plastic material. The printing medium may be provided in a print zone of a printer.

The radiation may comprise electromagnetic radiation, in particular visible or non-visible light. According to some examples, the radiation may comprise infrared radiation or ultraviolet radiation.

Any source of the radiation may be considered an emitter element in the context of the present disclosure.

In particular, the emitter element may comprise an LED emitter.

In the context of the present disclosure, a radiation power output may denote an amount of radiation energy per time unit emitted by the thermal treatment unit/emitter element.

According to an example, the radiation power output may denote the amount of radiation energy per time unit emitted by the thermal treatment unit/emitter element towards the printing medium and/or received by the printing medium, in particular the amount of radiation energy per time unit and unit angle or the amount of radiation energy per time unit and area unit of the printing medium.

According to an example, the carriage may be adapted to move with a constant velocity across the printing medium along the width direction.

In the context of the disclosure, the carriage may be considered to move with a constant velocity if a spatial variation of the velocity of the carriage across the printing medium is less than 10%, in particular less than 5% or less than 3%.

According to an example, varying the radiation power output may comprise varying a radiation energy per time unit emitted by the thermal treatment unit/emitter element.

According to an example, varying the radiation power output may comprise varying a radiation energy per time unit received by the printing medium, in particular received by the printing medium per unit angle and/or per unit area.

Alternatively or additionally, varying the radiation power output may also comprise varying a velocity of the carriage across the printing medium.

In a second aspect, the disclosure also relates to a printer comprising a carriage to move across a printing medium, and a thermal treatment unit with some or all of the features disclosed above, wherein the thermal treatment unit is mounted on the carriage.

In particular, in the second aspect the disclosure may relate to a printer comprising a carriage to move across a printing medium; and a thermal treatment unit that is mounted on the carriage and comprises an emitter element to emit radiation towards the printing medium to thermally treat the printing medium, wherein the thermal treatment unit is adapted to vary a radiation power output of the emitter element in terms of a spatial position of the carriage along a width direction of the printing medium.

In particular, the carriage may be a printhead carriage, on which a printhead of the printer is mounted.

According to an example, the printer further comprises a sensing element adapted to sense the spatial position of the carriage along the width direction, wherein the sensing element is adapted to provide the sensed position to the thermal treatment unit, and the thermal treatment unit is adapted to vary the radiation power output in accordance with the sensed position.

The sensing element may be a sensing element of the printhead carriage.

In a third aspect, the disclosure relates to a method for thermally treating a printing medium by means of a thermal treatment unit, the thermal treatment unit being mounted on a carriage that moves across the printing medium. The method comprises varying a radiation power output of the thermal treatment unit in terms of a spatial position of the carriage along a width direction of the printing medium.

According to an example, the radiation power output at a lateral side portion of the printing medium is lower than the radiation power at a center portion of the printing medium.

According to an example, the method further comprises sensing a position of the carriage along the width direction; providing the sensed position to the thermal treatment unit; and varying the radiation power output in accordance with the sensed position.

In a fourth aspect, the disclosure relates to a computer program or computer program product comprising computer-readable instructions for operating a thermal treatment unit for a printer, the thermal treatment unit being mountable on a carriage that moves across a printing medium, such that the computer-readable instructions control the thermal treatment unit to vary a radiation power output of the thermal treatment unit in terms of a spatial position of the carriage along a width direction of the printing medium.

The features of the thermal treatment unit for a printer and the features of the method for thermally treating a printing medium as discussed above may appear in isolation in some examples, but may in other examples also appear in any combination.

The description and the figures merely serve to illustrate the techniques according to the present disclosure, but should not be understood to imply any limitation. The scope of the disclosure is defined by the appended claims.

The invention claimed is:

1. A thermal treatment unit for a printer, wherein the thermal treatment unit is mountable on a carriage that moves across a printing medium, the thermal treatment unit comprising:

an emitter element to emit radiation towards the printing medium to thermally treat the printing medium;

the thermal treatment unit to vary a radiation power output of the emitter element based upon, at least in part, a spatial position of the carriage along a width direction of the printing medium, wherein the thermal treatment unit is configured to vary the radiation power output of the emitter element, such that the radiation power output at a lateral side portion of the printing medium is lower than the radiation power output at a center portion of the printing medium, and wherein the radiation power output of the emitter element rises continuously and monotonically from the lateral side portion of the printing medium until the center portion of the printing medium.

2. The thermal treatment unit according to claim 1, wherein the thermal treatment unit is configured to vary the radiation power output to decrease continuously and monotonically from a second power value at the center portion of the printing medium until a third power value at a second lateral side portion of the printing medium, the second lateral side portion being opposite to the lateral side portion.

3. The thermal treatment unit according to claim 1, wherein a spatial power distribution of the radiation power output along the width direction is mirror-symmetric with respect to a center portion of the printing medium.

4. The thermal treatment unit according to claim 1, wherein the thermal treatment unit varies the radiation power output such that a total heat flow from the emitter element to the printing medium is constant irrespective of a spatial position along the width direction.

5. The thermal treatment unit according to claim 1, wherein the thermal treatment unit varies the radiation power output such that a maximum temperature of the printing medium is constant irrespective of a spatial position along the width direction.

6. The thermal treatment unit according to claim 1, wherein the emitter element comprises an LED emitter.

7. A printer comprising:

a carriage to move across a printing medium; and a thermal treatment unit according to claim 1, wherein the thermal treatment unit is mounted on the carriage and configured to vary a radiation power output of a emitter element based upon, at least in part, a spatial position of the carriage along a width direction of the printing medium, wherein the radiation power output of the emitter element rises continuously from a first lateral side portion of the printing medium until a center portion of the printing medium.

8. The printer according to claim 7, further comprising a sensing element to sense the spatial position of the carriage along the width direction, the sensing element to provide the spatial position to the thermal treatment unit, and the thermal treatment unit to vary the radiation power output in accordance with the spatial position.

9. The printer according to claim 7, further comprising a printhead mounted on the carriage.

10. A method for thermal treatment of a printing medium by means of a thermal treatment unit, the thermal treatment unit being mounted on a carriage that moves across the printing medium, the method comprising:

varying a radiation power output of the thermal treatment unit based upon, at least in part, a spatial position of the carriage along a width direction of the printing medium, wherein the radiation power output rises continuously and monotonically from a first lateral side portion of the printing medium until a center portion of the printing medium.

11. The method according to claim 10, further comprising:

sensing a position of the carriage along the width direction;

providing the position to the thermal treatment unit; and varying the radiation power output in accordance with the position.

12. A computer program comprising computer-readable instructions stored on a non-transitory storage medium for operating a thermal treatment unit for a printer, the thermal treatment unit being mountable on a carriage that moves across a printing medium, such that the computer-readable instructions control the thermal treatment unit to:

vary a radiation power output of the thermal treatment unit based upon, at least in part, a spatial position of the carriage along a width direction of the printing medium, wherein the radiation power output rises continuously and monotonically from a first lateral side portion of the printing medium until a center portion of the printing medium.

* * * * *